United States Patent
Haggman et al.

(10) Patent No.: US 7,186,771 B2
(45) Date of Patent: Mar. 6, 2007

(54) AIR DRYING WATERBORNE RESIN COMPOSITION

(75) Inventors: Bo Haggman, Lund (SE); Hakan Bjornberg, Angelholm (SE); Birger Midelf, Angelholm (SE); David James, Helsingborg (SE)

(73) Assignee: Perstorp Specialty Chemicals AB, Perstorp (SE)

( * ) Notice: Subject to any disclaimer, the term of this patent is extended or adjusted under 35 U.S.C. 154(b) by 0 days.

(21) Appl. No.: 10/532,058

(22) PCT Filed: Oct. 16, 2003

(86) PCT No.: PCT/SE03/01605

§ 371 (c)(1),
(2), (4) Date: May 19, 2005

(87) PCT Pub. No.: WO2004/037928

PCT Pub. Date: May 6, 2004

(65) Prior Publication Data

US 2006/0052510 A1    Mar. 9, 2006

(30) Foreign Application Priority Data

Oct. 25, 2002 (SE) .................................. 0203156

(51) Int. Cl.
*C08J 3/00* (2006.01)
*C08K 5/00* (2006.01)
*C08L 67/00* (2006.01)
*C08L 75/00* (2006.01)
*C08G 18/42* (2006.01)

(52) U.S. Cl. ....................... 524/500; 524/504; 524/507; 524/513; 524/515; 524/517; 524/522; 524/539

(58) Field of Classification Search ................ 524/500, 524/504, 507, 513, 515, 517, 522, 539
See application file for complete search history.

(56) References Cited

U.S. PATENT DOCUMENTS 5,418,301 A    5/1995    Hult et al.

FOREIGN PATENT DOCUMENTS

| WO | 0158987 A2 | 8/2001 |
| WO | 0158987 A3 | 8/2001 |
| WO | 0232982 A1 | 4/2002 |

OTHER PUBLICATIONS

Alderich Chemical Catelogue, p. 1925, 2005-2006.*

* cited by examiner

*Primary Examiner*—Patrick D. Niland
(74) *Attorney, Agent, or Firm*—Stevens, Davis, Miller & Mosher, L.L.P.

(57) ABSTRACT

An air drying waterborne resin composition is disclosed. Said resin composition comprises at least one amphiphlic air drying dendritic polymer, at least one non-amphiphilic air drying alkyd resin, at least one drier initiating and/or promoting autoxidation, and water, and optionally at least one anionic and/or nonionic surfactant, and/or at least one coalescent agent. Said at least one amphiphilic air drying dendritic polymer is built up from a polyhydric dendritic core polymer having terminal hydroxyl groups and at least one unsaturated carboxylic acid and at least one adduct, obtainable by addition of a monoalkylated polyethylene glycol to a dicarboxylic acid or anhydride and/or a diisocyanate, each bonded to at least one terminal hydroxyl group in said polyhydric dendritic core polymer.

23 Claims, No Drawings

AIR DRYING WATERBORNE RESIN COMPOSITION

This application is a §371 U.S. National Stage Application of International Application No. PCT/SE2003/001605, filed on Oct. 16, 2003, claiming the priority of Swedish Application No. 0203156-5, filed Oct. 25, 2002, the entire disclosures of which are incorporated herein by reference in their entireties.

The present invention refers to a waterborne resin composition, such as a resin emulsion, dispersion or solution, comprising at least one amphiphilic air drying dendritic polymer and at least one non-amphiphilic air drying resin, such as a short, medium or long oil alkyd. In further aspects the present invention refers to a method for producing said resin composition and the use of said amphiphilic dendritic polymer as dispersing resin.

A waterborne coating or resin is one that is diluted with water before use. Even though the dominant volatile is water, most waterborne coatings contain some solvent. Latex coatings dominate the architectural market, interior as well as exterior, with flat, semi-gloss and gloss coatings. Waterborne systems are also used in industrial maintenance coatings based on water soluble or dispersible resin systems. A further class include waterborne alkyds and polyesters. Although no longer the principal class of resins used in coatings, alkyds are still very important and a wide range of types of alkyds are manufactured. Whereas some non-drying alkyds are used as plasticisers in lacquers or crosslinked with melamine-formaldehyde resins in baking enamels, the majority are autoxidatively drying alkyds for use in coatings for ambient air drying and forced drying applications. The principal advantages of alkyds are low cost and relatively foolproof application characteristics.

Waterborne alkyd and polyester resins have typically terminal hydroxyl and carboxyl groups and an acid value of 40–60 mg KOH/g. In order to make such a resin reproducibly with a minimum risk of gelation, the reactivity of the different carboxyl groups must vary significantly. The use of trimellitic anhydride, near the end of the reaction at a lower temperature takes advantage of the higher reactivity of the anhydride group. Another method uses for instance dimethylolpropionic acid, as part of the diol in making a polyester. The highly hindered carboxylic acid esterfies more slowly than the carboxyl groups from for instance isophthalic and adipic acids. After carrying out the reaction to the appropriate acid number, the alkyd or polyester is dissolved in for instance a glycol ether. An amine or ammonia, is used to neutralise the acid groups, pigment is dispersed in the resin solution, additives such as surfactants and driers are added, and the coating is reduced to application viscosity with water. The resin in the diluted coating is not in solution but forms aggregates swollen with solvent and water. The storage life of such systems is limited by their relatively facile hydrolysis. Improved storage stability is often achieved by addition of large amounts of surfactants, which, however, increase the moisture sensitivity of the dried coatings.

Waterborne alkyds as discussed above give comparable drying performance to conventional and traditional solvent based alkyds. However, they are not widely used because film properties tend to be poorer than those of solvent based alkyds, especially in air drying systems. Waterborne alkyds typically, as disclosed above, have high acid values and are neutralised to be water dilutable while conventional alkyds have low acid values not yielding water dilutability if and when neutralised. Film formation occurs by the evaporation of volatiles followed by crosslinking through ambient autoxidative reactions or elevated temperature reactions. Solvents are used as for instance coalescent, that is to promote film formation and improve film quality. Relative humidity can have a significant impact on drying behaviour and film quality. Waterborne formulations that perform well when applied under dry conditions may be deficient under high humidity conditions. The rate of water evaporation is much slower at high humidity, but solvent evaporation continues. This results in solvent depletion during the critical phases of film formation and consequent poor film development. The slow loss of amine or ammonia, used to neutralise the high acid value, leads to short-term high sensitivity to water. Even in the fully dry films, the presence of unreacted carboxyl groups leads to films having comparatively poor water resistance limiting their usefulness. Waterborne and solvent based alkyds are thoroughly disclosed and discussed in "*Surface Coatings Technology*" Vol. VI "*Waterborne and Solvent Based Alkyds and their End User Applications*", by N. Tuck, John Wiley and Sons © 2000 SITA Technology Ltd.

Latex and water soluble polymers dry by mechanisms different to alkyd resins. A latex is composed of dispersed polymer particles in water, film formation occurs when the particles coalesce to establish a continuous film. The particles must have a glass transition temperature (Tg) low enough to flow and adhere to each other at application temperature. Coalescents act as temporary plasticisers during the film formation process, promoting Tg reduction and flow, then evaporating after film formation has occurred. The most common coalescents are slow evaporating glycol ethers and glycol ether esters. Glycols such as ethylene glycol or propylene glycol are commonly added for storage stability and resistance to freezing.

The present invention disclose a novel waterborne resin composition, such as an air drying resin emulsion, dispersion or solution, comprising an amphiphilic air drying dendritic polymer as dispersing resin for a non-amphiphilic air drying alkyd resin, such as a conventional alkyd normally used in solvent based systems, whereby disadvantages, disclosed above, with waterborne alkyds are eliminated or substantially reduced.

The waterborne resin composition of the present invention comprises at least one amphiphilic air drying dendritic polymer, at least one non-amphiphilic air drying resin, at least one drier initiating and/or promoting autoxidation, and water. Said resin composition may additionally comprise as optional components at least one anionic and/or nonionic surfactant, and/or at least one coalescent agent.

The amphiphilic air drying dendritic polymer is nonionic and self-emulsifying and is built up from a dendritic core polymer, having terminal hydroxyl groups, being chain extended by a combination of hydrophobic chains comprising an unsaturated carboxylic acid providing air drying properties and hydrophilic polyethylene glycol chains. The amphiphilic dendritic polymer is in the resin composition used as a drying dispersing resin and stabiliser for emulsification of for instance conventional alkyd resins typically used in solvent based systems.

The amphiphilic air drying dendritic polymer is nonionic and self-emulsifying and is built up from a polyhydric dendritic core polymer having at least 4 terminal hydroxyl groups and thus a hydroxyl functionality ($f$) of at least 4, such as 8, 16, 32 or 64, at least one carboxylic acid bonded to at least one and at most $f$-1 said terminal hydroxyl groups and at least one adduct, obtainable by addition of a monoalkylated polyethylene glycol to an anhydride of a dicarboxylic acid, a dicarboxylic acid or a diisocyanate, likewise bonded to at least one and at most $f$-1 said terminal hydroxyl groups.

The dendritic core polymer of said amphiphilic dendritic polymer is in various embodiments a polyhydric dendritic polymer as disclosed in for instance WO 93/17060, WO 93/18079, WO 96/07688, WO 96/12754, WO 99/00439, WO 99/00440, WO 00/56802 and WO 02/40572. Said polyhydric dendritic core polymer is in said embodiments most preferably obtainable by addition of at least one di, tri or polyhydric monocarboxylic acid to a di, tri or polyhydric core molecule at a molar ratio yielding a polyhydric dendritic polymer comprising a core molecule and at least one branching generation bonded to said di, tri or polyhydric core molecule or is obtainable by ring opening addition of at least one oxetane of a di, tri or polyhydric compound to a di, tri or polyhydric core molecule at a molar ratio yielding a polyhydric dendritic polymer comprising a core molecule and at least one branching generation bonded to said di, tri or polyhydric core molecule.

Said di, tri or polyhydric core molecule is most preferably a 1,ω-diol, a 5-hydroxy-1,3-dioxane, a 5-hydroxyalkyl-1,3-dioxane, a 5-alkyl-5-hydroxyalkyl- 1,3-dioxane, a 5,5-di(hydroxyalkyl)-1,3-dioxane, a 2-alkyl-1,3-propanediol, a 2,2-dialkyl-1,3-propanediol, a 2-hydroxy-1,3-propanediol, a 2-hydroxy-2-alkyl-1,3-propanediol, a 2-hydroxyalkyl-2-alkyl-1,3-propanediol, a 2,2-di(hydroxyalkyl)-1,3-propanediol, a dimer, trimer or polymer of a said di, tri or polyhydric alcohol, or a reaction product between at least one alkylene oxide and a said di, tri or polyhydric alcohol or a said dimer, trimer or polymer.

Said di, tri or polyhydric monocarboxylic acid is most preferably 2,2-dimethylolpropionic acid, α,α-bis(hydroxymethyl)butyric acid, α,α,α-trishydroxymethyl)acetic acid, α,α-bis(hydroxymethyl)valeric acid, α,α-bis(hydroxymethyl)propionic acid, α,β-dihydroxy-propionic acid and/or 3,5-dihydroxybenzoic acid.

Said oxetane is most preferably a 3-alkyl-3-(hydroxyalkyl)oxetane, a 3,3-di(hydroxyalkyl)oxetane, a 3-alkyl-3-(hydroxyalkoxy)oxetane, a 3-alkyl-3-(hydroxyalkoxyalkyl)oxetane or a dimer, trimer or polymer of a 3-alkyl-3-(hydroxyalkyl)oxetane, a 3,3-dihydroxyalkyl)oxetane, a 3-alkyl-3-(hydroxyalkoxy)oxetane or a 3-alkyl-3-(hydroxyalkoxyalkyl)oxetane.

Said unsaturated carboxylic acid, by reaction added to said polyhydric dendritic core polymer, is in various embodiments of the amphiphilic dendritic polymer an aliphatic linear or branched fatty acid having for instance 8–24 carbon atoms in its main carbon chain, such as tall oil fatty acid, soybean fatty acid, safflower fatty acid, sunflower fatty acid, cottonseed fatty acid, castor fatty acid, oleic acid, linoleic acid and/or linolenic acid. Further suitable unsaturated carboxylic acids are found among vinylic acids, such as acrylic acid, methacrylic and/or crotonic acid used for instance in combination with one or more of said fatty acids.

Said adduct, by reaction added to said polyhydric dendritic polymer, is preferably and advantageously built up from at least one monoalkylated polyethylene glycol having a molecular weight of at least 500, such as 500–2500 or 700–1500, and at least one linear or branched aliphatic, cycloaliphatic or aromatic dicarboxylic acid or corresponding anhydride, such as adipic acid, azelaic acid, fumaric acid, maleic anhydride, phthalic acid or anhydride, isophthalic acid, tetrahydrophthalic anhydride, hexahydrophthalic anhydride, succinic acid or anhydride, and/or sebacic acid. Said monoalkylated polyethylene glycol is most preferably a monomethylated polyethylene glycol.

Said at least one non-amphiphilic alkyd resin included in the resin composition of the present invention is a short, medium and/or long oil air drying alkyd, such as a conventional alkyd resin typically used in solvent based resin compositions.

The preferred weight ratio amphiphilic dendritic polymer to non-amphiphilic resin is between 1:99 and 99:1, such as 50:50, 10:90, 20:80, 70:30, 90:10, 80:20 or 70:30. The most preferred weight ratio is typically 20–30% by weight of the amphiphilic dendritic polymer and 70–80% by weight of the non-amphiphilic resin. The amphiphilic dendritic polymer can furthermore and advantageously be used as dispersing resin in pigment pastes.

Said at least one drier included in the resin composition of the present invention is in embodiments preferably a metal drier, such as a Pb, Zr, Co, Li, K, Mn or Mg drier or combinations thereof and therewith, for instance as octoate and/or naphthenate, admixed in an amount of for instance 0.01–0.3%, such as 0.05–0.1%, calculated as metal on solid resins, that is solid amphiphilic air drying dendritic polymer and solid non-amphiphilic air drying resin.

Said optional surfactant is, if present, suitably admixed in an amount of 1–15%, such as 2–10%, by weight calculated on said at least one amphiphilic air drying dendritic polymer and said at least one non-amphiphilic air drying resin.

In a further aspect the present invention refers to a method for producing an air drying waterborne resin composition as disclosed above. Said method comprises i) mixing of said air drying dendritic polymer, said air drying resin and optionally said coalescent agent(s) at 40–80° C., such as 50–70° C. or 50–60° C., until a homogenous mixture is obtained, ii) adding and admixing said drier and optionally said surfactant and/or other additives, such as neutralising, flow and levelling agents, iii) mixing of the ingredients at 40–80° C., such as 50–70° C. or 50–60° C., during for instance 10–60 minutes, such as 20–40 or 20–30 minutes, and iv) adding, slowly under vigorous stirring, warm, such as 40–80° C., 50–70° C. or 50–60° C. water to requested final solid content, such as 40–50%, and/or viscosity, while maintaining the temperature at 40–80° C., such as 50–70° C. or 50–60° C.

A neutralising agent, such as an amine or ammonia, may be added to neutralise residual acid groups in primarily said air drying alkyd and/or said air drying dendritic polymer.

In yet a further aspect the present invention refers to the use of said amphiphilic air drying dendritic polymer, as herein disclosed, as water dispersing resin for non-amphiphilic air drying resins, such as said conventional alkyds, and/or as dispersing resin for pigments and/or fillers.

The amphiphilic air drying dendritic polymer can be used as dispersing resin to prepare waterborne alkyd coatings from said conventional alkyd resins. Surfactant free or solvent free waterborne systems based on long, medium or short oil alkyds can be obtained.

Without further elaboration, it is believed that one skilled in the art can, using the preceding description, utilise the present invention to its fullest extent. The following preferred specific embodiments are, therefore, to be construed as merely illustrative and not limitative of the remainder of the disclosure in any way whatsoever. In the following Examples 1–19 illustrate preparation of components included in the present invention, embodiments of the present invention and comparative testing.

Example 1: Synthesis of a polyalkoxylated adduct used in Example 2.
Example 2: Synthesis of an amphiphilic dendritic polymer, according to an embodiment of the invention, built up from a polyhydric dendritic core polymer, a fatty acid and the adduct obtained in Example 1.
Example 3: Synthesis of a conventional medium long oil alkyd.
Example 4: Synthesis of a conventional short oil alkyd.
Example 5: Preparation of a surfactant free waterborne resin composition, according to an embodiment of the invention, comprising the product obtained in Example 2 and a commercially available long oil alkyd.
Example 6: Preparation of a waterborne resin composition, according to an embodiment of the invention, comprising the products obtained in Examples 2 and 3.
Example 7: Preparation of a coalescent agent free waterborne resin composition, according to an embodiment of the invention, comprising the products obtained in Examples 2 and 3.
Example 8: Preparation of a waterborne resin composition, according to an embodiment of the invention, comprising the products obtained in Example 2 and 4.
Example 9: Preparation of a coalescent agent free waterborne resin composition, according to an embodiment of the invention, comprising the products obtained in Examples 2 and 4.
Example 10: Preparation of a pigment paste comprising the product obtained in Example 2.
Example 11: Preparation of a white paint using the resin composition of Example 5 and the pigment paste of Example 10.
Example 12: Preparation of a white paint using the resin composition of Example 6 and the pigment paste of Example 10.
Example 13: Preparation of a white paint using the resin composition of Example 7 and the pigment paste of Example 10.
Example 14: Preparation of a white paint using the resin composition of Example 8 and the pigment paste of Example 10.
Example 15: Preparation of a white paint using the resin composition of Example 9 and the pigment paste of Example 10.
Example 16: Evaluation of drying characteristics and film properties of resin compositions obtained in Examples 5–7 compared to solvent based alkyds according to Examples 3 and 4.
Example 17: Evaluation of drying characteristics and film properties of the white paints obtained i Examples 12–16.
Example 18: Preparation of a coalescent agent and surfactant free waterborne resin composition, according to an embodiment of the invention, comprising the products obtained in Example 2 and a the commercially available long oil used in Example 5.
Example 19: Comparative example outside the scope of the invention. Emulsification of the medium oil alkyd obtained in Example 3 without using the amphiphilic dendritic polymer Example 2, but using the same additive package used in the Example 6.

EXAMPLE 1

618 g of a monomethylated polyethylene glycol (molecular weight 750 g/mole) was charged in a 1 l reaction flask, equipped with stirrer, and heated to 100° C. Vacuum was now applied and the temperature increased to 120° C. and 18.2 g of succinic anhydride was added. The reaction was stopped after approximately 30 minutes, when an acid number of 66 mg KOH/g was reached, by cooling to room temperature. The final product was at room temperature a semi-crystalline solid.

EXAMPLE 2

Step 1: 246 g of Boltorn® H20 (hydroxyfunctional dendritic polyester, Perstorp Specialty Chemicals AB, Sweden) and 440 g of sunflower fatty acid was charged in a 1 l reaction flask, equipped with stirrer and a Dean Stark water trap, and heated to 125° C. 0.68 g of benzoic acid, 0.07 g of Fascat® 4100 (esterification catalyst) and xylene was now added and the temperature was increased to 190° C. and kept for about 5 hours. The acid number was after said 5 hours 2.5 mg KOH/g and xylene was removed under vacuum. The reaction was stopped by cooling to room temperature.

Obtained product had a hydroxyl value of 62 mg KOH/g and a viscosity of 1.84 Pas at 23° C.

Step 2: 340 g of the product obtained in Step 1 and 200 g of the adduct obtained in Example 1 were charged in a 1 l reaction flask, equipped with stirrer and a Dean Stark water trap. The reaction mixture was heated to 180° C. and xylene and 0.05 g of Fascat® 4100 (esterification catalyst) were added to the reaction mixture. The reaction was stopped when an acid value of 8.5 mg KOH/g was reached. Xylene was removed under vacuum, the product cooled to 90° C. and 25 g of distilled water was added.

Obtained amphiphilic air drying dendritic polymer was a liquid at room temperature having a viscosity of 12 Pas and a final acid value of 5.7 mg KOH/g. The average molecular weight was 10032 g/mol.

EXAMPLE 3

942 g of soybean fatty acid was charged in a 2 l reaction flask, equipped with stirrer, a Dean Stark water trap and nitrogen purge, and the temperature was raised to 160° C. 207 g of pentaerythritol, 394 g of phthalic anhydride and xylene (azeotropic solvent) were under nitrogen blanket charged to the reactor and the temperature raised to 240° C. The reaction was allowed to continue until an acid value below 15 mg KOH/g was reached. The product was cooled to room temperature.

Obtained alkyd had a final acid value of 7 mg KOH/g, a hydroxyl value of 134 mg KOH/g and an oil length of 62.9% (as triglyceride).

EXAMPLE 4

574 g of soybean fatty acid was charged in a 2 l reaction flask, equipped with stirrer, a Dean Stark water trap and nitrogen purge, and the temperature was raised to 160° C. 45 g of pentaerythritol, 462 g of trimethylolpropane, 508 g of phthalic anhydride and xylene (azeotropic solvent) were under nitrogen blanket charged to the reactor and the temperature raised to 240° C. The reaction was allowed to continue until an acid value below 15 mg KOH/g was reached. The product was cooled to room temperature.

Obtained alkyd had a final acid value of 15 mg KOH/g, a hydroxyl value of 120 mg KOH/g and an oil length of 40% (as triglyceride).

EXAMPLE 5

40 g of the amphiphilic dendritic polymer obtained in Example 2, 160 g of a commercially available tall oil long oil alkyd resin (Duramac® 301-2007, McWorther Inc.) having an oil length of 82% (as triglyceride), 10 g of dipropylene glycol methyl ether and 11 g of dipropylene glycol n-butyl ether were charged in a 1 l laboratory flask equipped with a stirrer. The mixture was heated to 60° C. and maintained at this temperature. The mixture was stirred until homogeneity was obtained and then adjusted to pH 7.5 by addition of dimethylethylamine. 4 g of a Co/Li/Zr drier (Additol® VXW 6206, Solutia Inc.) was now added and stirring was allowed to continue for a further 10 minutes. 319 g of demineralised warm (50° C.) water was now slowly added over a period of 15 minutes and stirring was allowed to continue for a further 20 minutes. Obtained emulsion was finally cooled to room temperature under stirring.

Obtained emulsion (waterborne air drying resin composition) had a solid content of 38% and a viscosity of 150 mPas at 23° C. The emulsion was stable for at least 1 week at 50° C. and at least 6 months at room temperature.

EXAMPLE 6

60 g of the amphiphilic dendritic polymer obtained in Example 2, 180 g of the medium oil alkyd obtained in Example 3, 7.5 g of dipropylene glycol methyl ether and 10 g of dipropylene glycol n-butyl ether were charged in a 1 l laboratory flask equipped with a stirrer. The mixture was heated to 60° C. and maintained at this temperature. The mixture was stirred until homogeneity was obtained and then adjusted to pH 7.5 by addition of dimethylethylamine and 6 g of a nonionic surfactant (Triton X100) was added and admixed. 4 g of a Co/Li/Zr drier (Additol® VXW 6206, Solutia Inc.) was now added and stirring was allowed to continue for a further 10 minutes. 236 g of demineralised warm (50° C.) water was now slowly added over a period of 15 minutes and stirring was allowed to continue for a further 20 minutes. Obtained emulsion was finally cooled to room temperature under stirring.

Obtained emulsion (waterborne air drying resin composition) had a solid content of 38% and a viscosity of 100 mPas at 23° C. The emulsion was stable for at least 2 weeks at 50° C.

EXAMPLE 7

60 g of the amphiphilic dendritic polymer obtained in Example 2 and 180 g of the medium oil alkyd obtained in Example 3 were charged in a 1 l laboratory flask equipped with a stirrer. The mixture was heated to 60° C. and maintained at this temperature. The mixture was stirred until homogeneity was obtained and then adjusted to pH 7.5 by addition of dimethylethylamine and 12.5 g of a nonionic surfactant (Triton X100) was added and admixed. 4 g of a Co/Li/Zr drier (Additol® VXW 6206, Solutia Inc.) was now added and stirring was allowed to continue for a further 10 minutes. 243 g of demineralised warm (50° C.) water was now slowly added over a period of 15 minutes and stirring was allowed to continue for a further 20 minutes. Obtained emulsion was finally cooled to room temperature under stirring.

Obtained emulsion (waterborne air drying resin composition) had a solid content of 50% and a viscosity of 200 mPas at 23° C. The emulsion was stable for at least 2 weeks at 50° C.

EXAMPLE 8

60 g of the amphiphilic dendritic polymer obtained in Example 2, 180 g of the short oil alkyd obtained in Example 4, 7.5 g of dipropylene glycol methyl ether and 10 g of dipropylene glycol n-butyl ether were charged in a 1 l laboratory flask equipped with a stirrer. The mixture was heated to 60° C. and maintained at this temperature. The mixture was stirred until homogeneity was obtained and then adjusted to pH 7.5 by addition of dimethylethylamine and 6 g of a nonionic surfactant (Triton X100) was added and admixed. 4 g of a Co/Li/Zr (Additol® VXW 6206, Solutia Inc.) was now added and stirring was allowed to continue for a further 10 minutes. 239 g of demineralised warm (50° C.) water was now slowly added over a period of 15 minutes and stirring was allowed to continue for a further 20 minutes. Obtained emulsion was finally cooled to room temperature under stirring.

Obtained emulsion (waterborne air drying resin composition) had a solid content of 48% and a viscosity of 100 mPas at 23° C. The emulsion was stable for at least 1 week at 50° C.

EXAMPLE 9

60 g of the amphiphilic dendritic polymer obtained in Example 2 and 180 g of the short oil alkyd obtained in Example 4 were charged in a 1 l laboratory flask equipped with a stirrer. The mixture was heated to 60° C. and maintained at this temperature. The mixture was stirred until homogeneity was obtained and then adjusted to pH 7.5 by addition of dimethylethylamine and 12.5 g of a nonionic surfactant (Triton X100) was added and admixed. 4 g of a Co/Li/Zr drier (Additol® VXW 6206, Solutia Inc.) was now added and stirring was allowed to continue for a further 10 minutes. 243 g of demineralised warm (50° C.) water was now slowly added over a period of 15 minutes and stirring was allowed to continue for a further 20 minutes. Obtained emulsion was finally cooled to room temperature under stirring.

Obtained emulsion (waterborne air drying resin composition) had a solid content of 50% and a viscosity of 150 mPas at 23° C. The emulsion was stable for at least 1 week at 50° C.

EXAMPLE 10

48 g of the amphiphilic polymer obtained in Example 2 was charged in a 1 l laboratory flask equipped with stirrer. 5 g of dipropylene glycol n-butyl ether and 15 g of a partially neutralised alkylammonium salt of a polycarboxylic acid polymer and a polydimethylsiloxane (Lactimon® WS Dow Inc.) were added under stirring. 210 g of warm (50° C.) water was added over a period of 15 minutes. 25 g of obtained emulsion was charged in a high speed dissolver and 75 g of $TiO_2$ (Kronos® 2310, Kronos GmbH) was added during 15 minutes. Dissolving was allowed to continue for a further 30 minutes.

Obtained pigment paste had a viscosity of 15 Pas at 23° C. and a solid content of 78%.

EXAMPLE 11

45 g of the emulsion obtained in Example 5 was charged in a 1 l laboratory flask, equipped with a stirrer, and mixed with 55 g of the pigment paste obtained in Example 10. The mixture was stirred for 30 minutes at room temperature.

Obtained white paint was stored for 24 hours before evaluation of drying and other properties.

Obtained white paint, comprising a waterborne air drying resin composition, had a solid content of 60%, a pigment to resin ratio of 1.9:1 and a viscosity of 150 mPas at 23° C.

EXAMPLE 12

45 g of the emulsion obtained in Example 6 was charged in a 1 l laboratory flask, equipped with a stirrer, and mixed with 55 g of the pigment paste obtained in Example 10. The mixture was stirred for 30 minutes at room temperature. Obtained white paint was stored for 24 hours before evaluation of drying and other properties.

Obtained white paint, comprising a waterborne air drying resin composition, had a solid content of 65%, a pigment to resin ratio of 1.6:1 and a viscosity of 150 mPas at 23° C.

EXAMPLE 13

45 g of the emulsion obtained in Example 7 was charged in a 1 l laboratory flask, equipped with a stirrer, and mixed with 55 g of the pigment-paste obtained in Example 10. The mixture was stirred for 30 minutes at room temperature. Obtained white paint was stored for 24 hours before evaluation of drying and other properties.

Obtained white paint, comprising a waterborne air drying resin composition, had a solid content of 65%, a pigment to resin ratio of 1.6:1 and a viscosity of 150 mPas at 23° C.

EXAMPLE 14

45 g of the emulsion obtained in Example 8 was charged in a 1 l laboratory flask, equipped with a stirrer, and mixed with 55 g of the pigment paste obtained in Example 10. The mixture was stirred for 30 minutes at room temperature. Obtained white paint was stored for 24 hours before evaluation of drying and other properties.

Obtained white paint, comprising a waterborne air drying resin composition, had a solid content of 65%, a pigment to resin ratio of 1.6:1 and a viscosity of 200 mPas at 23° C.

EXAMPLE 15

45 g of the emulsion obtained in Example 6 was charged in a 1 l laboratory flask, equipped with a stirrer, and mixed with 55 g of the pigment paste obtained in Example 10. The mixture was stirred for 30 minutes at room temperature. Obtained white paint was stored for 24 hours before evaluation of drying and other properties.

Obtained white paint, comprising a waterborne air drying resin composition, had a solid content of 65%, a pigment to resin ratio of 1.6:1 and a viscosity of 150 mPas at 23° C.

EXAMPLE 16

The drying properties of the emulsions, waterborne air drying resin compositions, obtained in Examples 5–9 were determined in a Beck Koller™ tester (Sheen Instrument, UK). The hardness was measured as pendulum hardness and expressed as König seconds.

The alkyd resins obtained in Examples 3 and 4 (Ref. 1 and 2) were dissolved in xylene and used as references. The same drier and the same amount of drier as in the waterborne resin compositions were used and the same evaluations were performed.

|   | Ref. 1 | Ref. 2 | Ex. 5 | Ex. 6 | Ex. 7 | Ex. 8 | Ex. 9 |
|---|---|---|---|---|---|---|---|
| Drying Time: | | | | | | | |
| Dry film, μm | 50–60 | 50–60 | 50–60 | 50–60 | 50–60 | 50–60 | 50–60 |
| Tackfree, hrs | 12.5 | 4.5 | 5.5 | 2 | 1.5 | 5 | 4 |
| Through dry, hrs | >24 | 14 | 20.5 | 6 | 5.5 | 22 | 21 |
| Pendulum Hardness: | | | | | | | |
| Dry film, μm | 50–60 | 50–60 | 50–60 | 50–60 | 50–60 | 50–60 | 50–60 |
| 2 days, König secs. | 14 | 21 | 25 | 16 | 16 | 7 | 7 |
| 4 days, König secs. | 14 | 32 | 25 | 15 | 15 | 8 | 9 |
| 7 days, König secs. | 14 | 36 | 25 | 15 | 15 | 9 | 9 |
| 10 days, König secs. | 16 | 42 | 24 | 14 | 14 | 8 | 8 |
| 14 days, König secs. | 18 | 46 | 24 | 14 | 14 | 8 | 8 |

EXAMPLE 17

The drying properties of the white paints obtained in Examples 11–15 were determined on a Beck Koller™ tester (Sheen Instrument, UK). The gloss, at 20° and 60°, was determined after 48 hours of drying and the hardness was measured as pendulum hardness and expressed as König seconds. All paints were coated at a wet film thickness of 120 μm.

|   | Ex. 11 | Ex. 12 | Ex. 13 | Ex. 14 | Ex. 15 |
|---|---|---|---|---|---|
| Drying Time and Gloss: | | | | | |
| Tack free, hrs | 3.5 | 0.4 | 0.4 | 2.5 | 2.4 |
| Through dry, hrs | 18 | 4 | 4 | 16 | 16 |
| Gloss 20° | 40 | 54 | 61 | 22 | 48 |
| Gloss 60° | 75 | 88 | 89 | 66 | 75 |
| Pendulum Hardness: | | | | | |
| 2 days, König secs. | 25 | 16 | 16 | 7 | 7 |
| 4 days, König secs. | 25 | 15 | 15 | 8 | 9 |
| 7 days, König secs. | 25 | 15 | 15 | 9 | 9 |
| 10 days, König secs. | 24 | 14 | 14 | 8 | 8 |
| 14 days, König secs. | 24 | 14 | 14 | 8 | 8 |

EXAMPLE 18

40 g of the amphiphilic dendritic polymer obtained in Example 2 and 160 g of a commercially available tall oil long oil alkyd resin (Duramac® 301-2007, McWorther Inc.) having an oil length of 82% (as triglyceride) were charged in a 1 l laboratory flask equipped with a stirrer. The mixture was heated to 60° C. and maintained at this temperature. The mixture was stirred until homogeneity was obtained and then adjusted to pH 7.5 by addition of dimethylethylamine. 4 g of a Co/Li/Zr drier (Additol® VXW 6206, Solutia Inc.) was now added and stirring was allowed to continue for a further 10 minutes. 450 g of demineralised warn (50° C.) water was now slowly added over a period of 15 minutes and stirring was allowed to continue for a further 20 minutes. Obtained emulsion was then cooled to room temperature under stirring.

Obtained emulsion (waterborne air drying resin composition) had a solid content of 30% and a viscosity of 300 mPas at 23° C. The emulsion was stable for at least 6 months at room temperature.

EXAMPLE 19

240 g of the medium oil alkyd obtained in Example 3, 7.5 g of dipropylene glycol methyl ether and 10 g of dipropylene glycol n-butyl ether were charged in a 1 l laboratory flask equipped with a stirrer. The mixture was heated to 60° C. and maintained at this temperature. The mixture was stirred until homogeneity was obtained and then adjusted to pH 7.5 by addition of dimethylethylamine and 6 g of a nonionic surfactant (Triton X100) was added and admixed. 4 g of a Co/Li/Zr drier (Additol® VXW 6206, Solutia Inc.) was now added and stirring was allowed to continue for a further 10 minutes. 236 g of demineralised warm (50° C.) water was now slowly added over a period of 15 minutes and stirring was allowed to continue for a further 20 minutes. Obtained emulsion was finally cooled to room temperature under stirring.

Obtained emulsion separated within 15 minutes at room temperature.

The invention claimed is:

1. An air drying waterborne resin composition comprising at least one amphiphilic air drying dendritic polymer, at least one non-amphiphilic air drying resin, at least one drier initiating and/or promoting autoxidation, water and optionally at least one anionic and/or nonionic surfactant and/or at least one coalescent agent
wherein said at least one amphiphilic air drying dendritic polymer is built up from a polyhydric dendritic core polymer having at least 4 terminal hydroxyl groups and thus a hydroxyl functionality ($f$) of at least 4, and at least one unsaturated carboxylic acid bonded to at least one and at most $f$-1 said terminal hydroxyl group(s) and at least one adduct, obtained by addition of at least one monoalkylated polyethylene glycol to at least one dicarboxylic acid or at least one corresponding anhydride and/or at least one diisocyanate, bonded to at least one and at most $f$-1 said terminal hydroxyl group(s), and that said at least one non-amphiphilic air drying resin is a short, medium or long oil air drying alkyd.

2. An air drying waterborne resin composition according to claim 1, wherein said polyhydric dendritic core polymer is obtained by addition of at least one di, tri or polyhydric monocarboxylic acid to a di, tri or polyhydric core molecule at a molar ratio yielding a polyhydric dendritic polymer comprising a core molecule and at least one branching generation bonded to said di, tri or polyhydric core molecule.

3. An air drying waterborne resin composition according to claim 1, wherein said polyhydric core dendritic polymer is obtained by ring opening addition of at least one oxetane of a di, tri or polyhydric compound to a di, tri or polyhydric core molecule at a molar ratio yielding a polyhydric dendritic polymer comprising a core molecule and at least one branching generation bonded to said di, tri or polyhydric core molecule.

4. An air drying waterborne resin composition according to claim 1, wherein said at least one monoalkylated polyethylene glycol is a monomethylated polyethylene glycol.

5. An air drying waterborne resin composition according to claim 1, wherein said at least one dicarboxylic acid or anhydride is at least one selected from the group consisting of adipic acid, azelaic acid, fumaric acid, maleic anhydride, phthalic acid or anhydride, isophthalic acid, tetrahydrophthalic anhydride, hexahydrophthalic anhydride, succinic acid or anhydride and sebacic acid.

6. An air drying waterborne resin composition according to claim 1, wherein said at least one unsaturated carboxylic acid is an aliphatic linear or branched fatty acid having 8–24 carbon atoms in its main carbon.

7. An air drying waterborne resin composition according to claim 1, wherein said at least one unsaturated carboxylic acid is tall oil fatty acid, soybean fatty acid, safflower fatty acid, sunflower fatty acid, cottonseed fatty acid, castor fatty acid, oleric acid, linoleic acid and/or linolenic acid.

8. An air drying waterborne resin composition according to claim 1, wherein a weight ratio of said air drying dendritic polymer to said air drying alkyd is between 1:99 and 99:1.

9. An air drying waterborne resin composition according to claim 1, wherein said at least one drier is at least one metal drier.

10. An air drying waterborne resin composition according to claim 1, wherein said at least one metal drier is present in an amount of 0.01–0.3% by weight, calculated as metal on solid resins.

11. An air drying waterborne resin composition according to claim 1, wherein said at least one surfactant is present in an amount of 1–15%, by weight calculated on solid resins.

12. A method of forming a composition comprising adding an amphiphilic air drying dendritic polymer according to claim 1, as water dispersing resin for a non-amphiphilic air drying resin.

13. A method of forming a composition comprising adding an amphiphilic air drying polymer according to claim 1, as dispersing agent for pigments and/or fillers.

14. An air drying waterborne composition according to claim 1, wherein $f$ is at least 8.

15. An air drying waterborne composition according to claim 1, wherein $f$ is at least 16.

16. An air drying waterborne composition according to claim 1, wherein $f$ is at least 32.

17. An air drying waterborne resin composition according to claim 1, wherein said at least one dicarboxylic acid or anhydride is at least one selected from the group consisting of linear or branched aliphatic, cycloaliphatic and aromatic dicarboxylic acid and anhydride.

18. An air drying waterborne resin composition according to claim 9, wherein said at least one metal drier is at least one selected from the group consisting of Pb, Zr, Co, Li, K, Mn and Mg.

19. An air drying waterborne resin composition according to claim 10, wherein said at least one metal drier is present in an amount of 0.05–0.3% by weight, calculated as metal on solid resins.

20. An air drying waterborne resin composition according to claim 1, wherein said at least one surfactant is present in an amount of 2–10% by weight, calculated on solid resins.

21. A method of producing an air drying waterborne resin composition according to claim 1, wherein said method comprises:
  i) mixing said at least one air drying dendritic polymer, said at least one air drying alkyd and optionally at least one coalescent agent at 40–80° C. until a homogenous mixture is obtained;
  ii) adding and admixing said at least one drier and optionally said at least one surfactant and optionally other additives;
  iii) mixing said ingredients at 40–80° C. for 10–60 minutes; and
  iv) adding slowly and under vigorous stirring water, having a temperature of 40–80° C.

22. A method according to claim 21, wherein a neutralizing agent is added to neutralize residual acid groups in said air drying alkyd and/or said air drying dendritic polymer.

23. A method according to claim 22, wherein said neutralizing agent is an amine or ammonia.

* * * * *